United States Patent
Kato et al.

(10) Patent No.: US 11,092,700 B2
(45) Date of Patent: Aug. 17, 2021

(54) SCINTILLATOR UNIT, RADIATION MEASURING DEVICE, AND RADIATION MEASURING METHOD

(71) Applicant: Hitachi, Ltd., Tokyo (JP)

(72) Inventors: Yuka Kato, Tokyo (JP); Yoshimune Ogata, Nagoya (JP); Haruka Minowa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/643,653

(22) PCT Filed: Oct. 25, 2018

(86) PCT No.: PCT/JP2018/039592
§ 371 (c)(1),
(2) Date: Mar. 2, 2020

(87) PCT Pub. No.: WO2019/082952
PCT Pub. Date: May 2, 2019

(65) Prior Publication Data
US 2020/0241153 A1    Jul. 30, 2020

(30) Foreign Application Priority Data
Oct. 27, 2017 (JP) .............................. JP2017-207795

(51) Int. Cl.
*G01T 1/203* (2006.01)
*G01T 7/02* (2006.01)
(Continued)

(52) U.S. Cl.
CPC ............... *G01T 1/203* (2013.01); *G01T 1/167* (2013.01); *G01T 7/02* (2013.01); *G01T 7/08* (2013.01)

(58) Field of Classification Search
CPC ................................ G01T 7/102; G01T 1/1606
See application file for complete search history.

(56) References Cited

U.S. PATENT DOCUMENTS 4,880,984 A * 11/1989 Shiraishi ................. G01T 1/204
250/484.4
5,294,795 A * 3/1994 Lehtinen ............... B01L 3/5085
250/328
(Continued)

FOREIGN PATENT DOCUMENTS

| EP | 2 930 538 A1 | 10/2015 |
| JP | 2016-024133 A | 2/2016 |

(Continued)

OTHER PUBLICATIONS

Machine Translation of JP 2016-223813 (Year: 2016).*
(Continued)

*Primary Examiner* — Yara B Green
(74) *Attorney, Agent, or Firm* — Baker Botts L.L.P.

(57) ABSTRACT

According to the present invention, a laminate is disposed on a spacer in a bottle. The laminate comprises: a sample layer that includes a sample sheet; an upper scintillator layer (upper member); and a lower scintillator layer (lower member). Each of the upper and lower scintillator layers is made of a plastic scintillator material. The sample sheet is manufactured by laminating a carrier such as filter paper having a radioactive substance adhered thereto.

9 Claims, 8 Drawing Sheets

(51) Int. Cl.
    *G01T 7/08*     (2006.01)
    *G01T 1/167*     (2006.01)

(56) References Cited

U.S. PATENT DOCUMENTS

| | | | |
|---|---|---|---|
| 5,637,506 A * | 6/1997 | Goken | B01J 20/28004 |
| | | | 210/502.1 |
| 2015/0034531 A1* | 2/2015 | Starke | B07B 11/02 |
| | | | 209/3.1 |
| 2017/0160409 A1 | 6/2017 | Furuta et al. | |
| 2019/0265369 A1* | 8/2019 | Archibald | G01T 1/003 |

FOREIGN PATENT DOCUMENTS

| | | |
|---|---|---|
| JP | 2016-223813 A | 12/2016 |
| WO | WO 2014/088046 A1 | 6/2014 |

OTHER PUBLICATIONS

International Search Report, dated Dec. 11, 2018, which issued during the prosecution of International Application No. PCT/JP2018/039592, which corresponds to the present application.

* cited by examiner

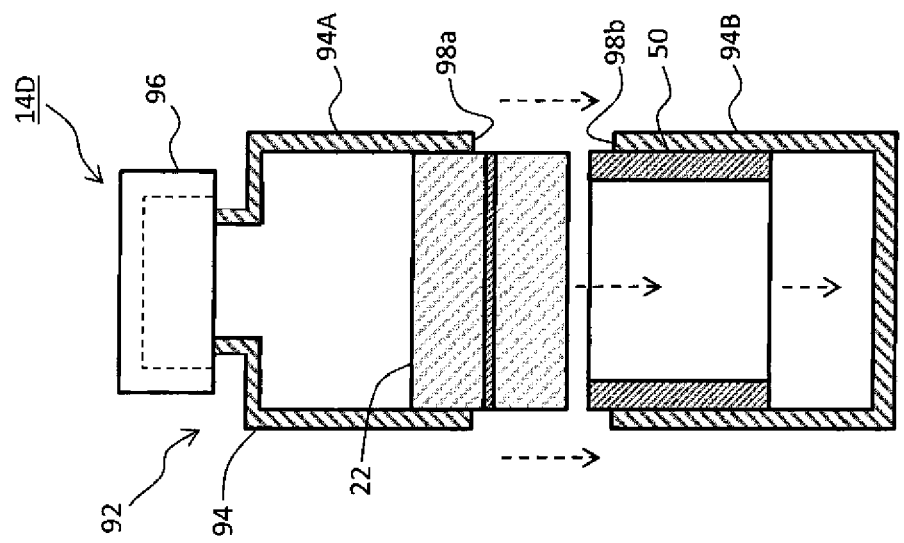

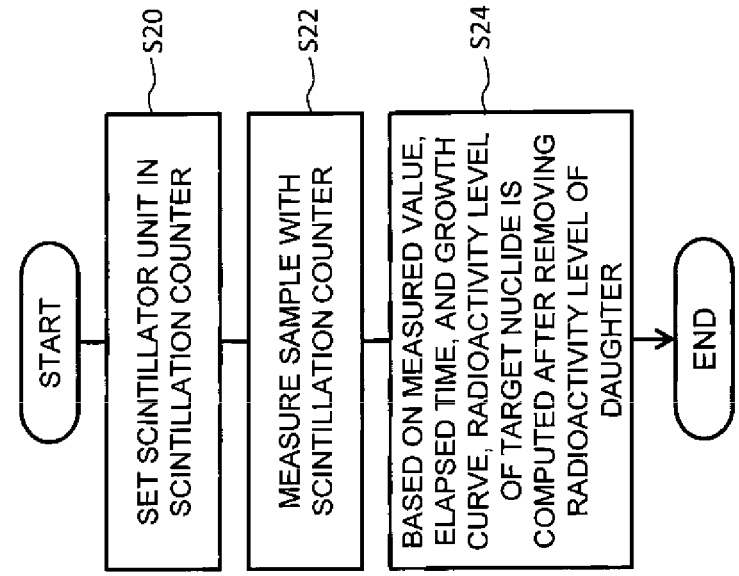
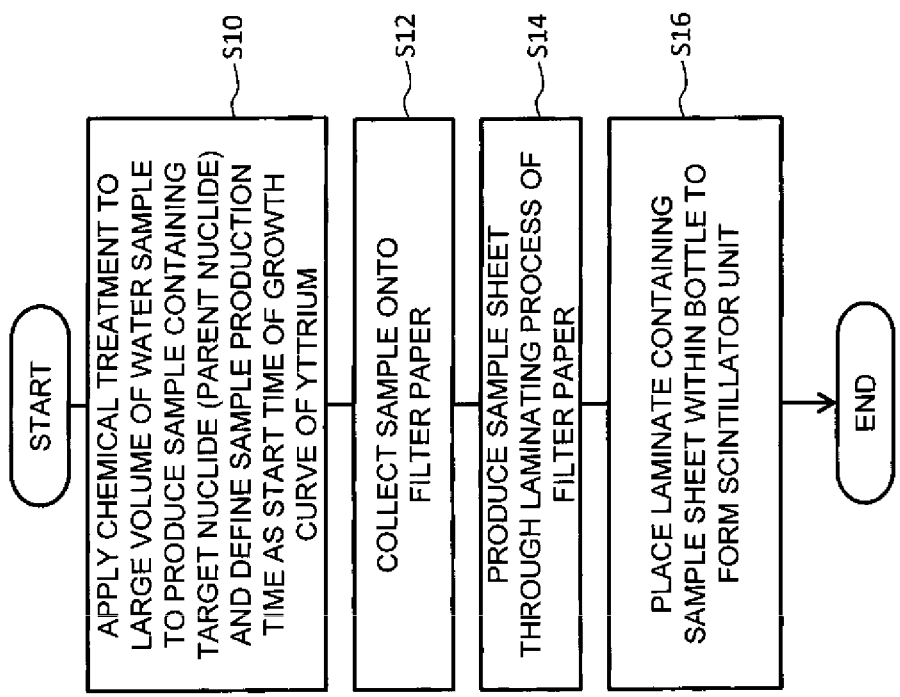

SCINTILLATOR UNIT, RADIATION MEASURING DEVICE, AND RADIATION MEASURING METHOD

TECHNICAL FIELD

The present invention relates to a scintillator unit, a radiation measuring device, and a radiation measuring method, and, in particular, relates to a technique for detecting radiation with a solid-state scintillator.

BACKGROUND

A scintillation counter has been known as a radiation measuring device which measures a radioactive substance within a liquid sample. Typically, the scintillation counter is an apparatus in which a liquid scintillator is used for detecting radiation (such as, for example, a β ray) emitted from the radioactive substance. The use of the liquid scintillator is accompanied with problems that an organic waste liquid is produced, that it is necessary to take measures against chemical quenching, that it is difficult to process a large quantity of a sample as a measuring target, and the like.

A measurement method has been suggested which uses a plastic scintillator in place of the liquid scintillator. In this measurement method, for example, a liquid sample is sandwiched between a pair of plastic scintillator members to form a sandwich body. The sandwich body is placed within a container, such as a vial. Then, the container which houses the sandwich body is set in a scintillation counter. In the scintillation counter, the container is introduced into a measurement chamber, and scintillation (light emission) occurring inside the measurement chamber is detected.

In radiation measuring devices disclosed in Patent Documents 1 and 2, a sandwich body itself has a plate-shaped form, and the sandwich body is placed in a standing state (at an erected position) within a container. Meanwhile, in a radiation measuring device disclosed in Patent Document 3, a radioactive gas is filled in a container which houses a large number of beads. Each of the beads is composed of a plastic scintillator material.

When the sandwich body placed in the container is in the erected position (i.e. in a case where it is of a horizontally laminated type), it becomes difficult to increase the thickness of each of plastic scintillator members (a thickness along a direction orthogonal to a planarly spreading sample). Specifically, in detection of high-energy radiation, the thickness of the plastic scintillator member must be increased, although difficulty is encountered in increasing a thickness of the sandwich body over an upper limit which is defined by an inner diameter of the container or a diameter of a mouth of the container. In addition, in the case of the horizontally laminated type, measurement is apt to be subjected to a directional dependence. That is, when scintillation occurring in the sandwich body is detected with a plurality of optical detectors arranged around the sandwich body, there is a possibility that the optical detectors have detection efficiencies or detection sensitivities which vary depending on an orientation of the sandwich body.

Meanwhile, it has been sought to meet a demand for using, as a measurement target, a carrier (such as a filter) itself which has a radioactive sample adhered thereto, and a demand for reusing a radioactive sample after its measurement. Hereinafter, an assembly composed of a plurality of scintillator members, a radioactive sample, and a member configured to retain both the scintillator members and a radioactive sample may be referred to as a scintillator unit, depending on context.

CITATION LIST

Patent Literature

Patent Document 1: WO 2014/088046
Patent Document 2: JP 2016-223813 A
Patent Document 3: JP 2016-24133 A

SUMMARY

Technical Problem

It is an object of the present invention to provide a scintillator unit having a novel structure capable of detecting radiation with a high degree of sensitivity or accuracy. Alternatively, it is an object of the present invention to implement a measurement method which allows detection of a radioactive substance contained in a liquid sample with a high degree of sensitivity.

Solution to Problem

A scintillator unit disclosed herein includes an upper member composed of a solid scintillator member which is disposed on an upper side of a radioactive sample, a lower member composed of a solid scintillator member which is disposed on a lower side of the radioactive sample, the lower member cooperating with the upper member to directly or indirectly sandwich the radioactive sample, and a retainer configured to retain a laminate which includes the upper member, the radioactive sample, and the lower member. A radiation measuring device disclosed herein includes a rack configured to hold a scintillator unit, a measurement chamber in which the scintillator unit taken out from the rack is introduced, and a plurality of optical detectors having a plurality of light receiving surfaces which are opposed to the scintillator unit placed in the measurement chamber. In the radiation measuring device, the scintillator unit includes an upper member composed of a solid scintillator member which is disposed on an upper side of a radioactive sample, a lower member composed of a solid scintillator member which is disposed on a lower side of the radioactive sample, the lower member cooperating with the upper member to directly or indirectly sandwich the radioactive sample, and a retainer configured to retain a laminate which includes the upper member, the radioactive sample, and the lower member.

A radiation measuring method disclosed herein includes steps of adhering a radioactive substance contained within a liquid sample to a carrier, sandwiching the carrier having the radioactive substance adhered thereto between a pair of films, to produce a sample sheet, sandwiching the sample sheet between an upper scintillator member and a lower scintillator member to form a laminate, placing the laminate in a container to form a scintillator unit, setting the scintillator unit in a scintillation counter, and detecting radiation emitted from the radioactive substance within the scintillation counter.

BRIEF DESCRIPTION OF DRAWINGS

FIG. 10 is a diagram showing a modification example of the scintillator unit.

FIG. 11 is a flowchart representing a pretreatment process.

FIG. 12 is a flowchart representing a measurement process.

DESCRIPTION OF EMBODIMENTS

Figure 1:
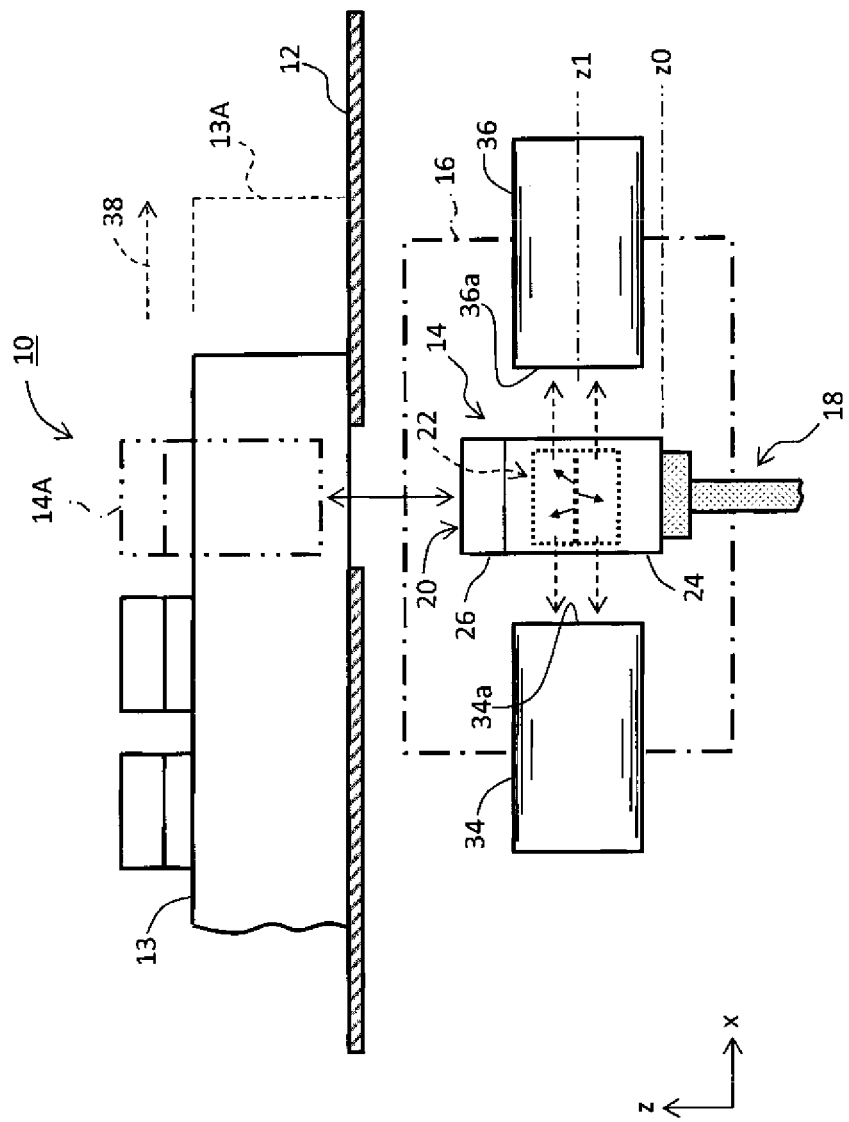
FIG. 1 is a diagram showing an example configuration of a radiation measuring device according to an embodiment.

Hereinafter, embodiments will be described with reference to the drawings.

(1) Overview of Embodiments

A scintillator unit according to an embodiment includes an upper member, a lower member, and a retainer. The upper member is composed of a solid scintillator member disposed on an upper side of a radioactive sample. The lower member is a solid scintillator member disposed on a lower side of the radioactive sample, and is configured to cooperate with the upper member to directly or indirectly sandwich the radioactive sample between the upper and lower members. The retainer is configured to retain a laminate consisting of the upper member, the radioactive sample, and the lower member.

According to the above-described configuration, the upper member, the radioactive sample, and the lower member are laminated on top of one another (in a vertical direction), to form the laminate. The laminate is retained in the retainer. Because the laminate has a vertically laminated structure, thicknesses (in the vertical direction) of the upper member and the lower member can be easily increased. In addition, when scintillation is detected with a plurality of optical detectors which are arranged to surround the scintillator unit (in a horizontal direction), in contrast to a horizontally laminated structure, a directional dependence can be reduced, or eliminated in the vertically laminated structure. The retainer is a member configured to retain the laminate, and may be implemented by a container, a frame unit, a stand, or the like.

In an embodiment, the laminate has a columnar form. In this configuration, because both the upper member and the lower member have disc shaped forms, the directional dependency can be eliminated. The forms of the upper member and the lower member may be, for example, in the shape of a polygon (as viewed from above). However, when the forms of the upper member and the lower member are defined as circular shapes, it becomes possible to have advantageous effects that manufacturing can be facilitated, that positioning can be easily achieved, and that each light receiving surface is apt to be located close to the laminate, in addition to the effect that the directional dependency can be eliminated.

In an embodiment, the retainer is a container in which the laminate is housed. When the laminate is placed within the container, the laminate can be easily placed in position, and even if there is a leakage of the radioactive sample, the leaked radioactive sample can be confined within the container.

The scintillator unit according to an embodiment includes a support member configured to support the laminate in a position where a middle level of the laminate matches a reference level within the container. According to this configuration, a detection sensitivity can be set at a stipulated level, or can be enhanced.

In an embodiment, the container includes a structure for applying a vertical pushing force to the laminate in a state where the laminate is housed in the container. With this configuration, the upper member and the lower member can be placed close to the radioactive sample. As a result, attenuation of radiation emitted from the radioactive sample is reduced, so that efficiency in emission of light can be increased.

In an embodiment, the scintillator unit includes a sample sheet containing the radioactive sample, the sample sheet being placed between the upper member and the lower member, and the sample sheet includes an upper film disposed on an upper side of the radioactive sample and a lower film disposed on a lower side of the radioactive sample. According to this configuration, the upper member and the lower member are prevented from directly contacting the radioactive sample, which can, in turn, protect the upper member and the lower member against radioactive contamination. In addition, the thus-protected upper and lower members can be easily reused. This can lead to reduction in measurement costs.

In an embodiment, the upper film and the lower film are joined to each other in their circumferential edge regions. When configured in this way, the radioactive sample can be confined within a sealed space. This can facilitate handling of the radioactive sample, and can hamper occurrence of contamination.

In an embodiment, the radioactive sample is adhered to a carrier, and the carrier having the radioactive sample adhered thereto is sandwiched between the upper film and the lower film. A sample sheet can be easily produced by inserting between a pair of films the carrier having the radioactive sample adhered thereto.

A radiation measuring device according to an embodiment includes a rack configured to retain a scintillator unit, a measurement chamber into which the scintillator unit removed from the rack is introduced, and a plurality of optical detectors having a plurality of light receiving surfaces which are opposed to the scintillator unit placed in the measurement chamber. The scintillator unit includes an upper member, a lower member, and a retainer. The upper member is composed of a scintillator member disposed on an upper side of a radioactive sample. The lower member is composed of a scintillator member disposed on a lower side of the radioactive sample, and is configured to cooperate with the upper member to directly or indirectly sandwich the radioactive sample. The retainer is configured to retain a laminate consisting of the upper member, the radioactive sample, and the lower member.

In the above-described configuration, during measurement of radiation, the plurality of optical detectors placed around the laminate detect light emitted in the laminate.

Because the laminate has the vertically laminated structure, changes in detection sensitivity depending on an orientation of the laminate can be reduced or prevented.

A radiation measuring method according to an embodiment includes steps of adhering a radioactive substance contained in a liquid sample to a carrier, sandwiching the carrier containing the adhered radioactive substance between a pair of films to produce a sample sheet, sandwiching the sample sheet between an upper scintillator member and a lower scintillator member to form a laminate, placing the laminate within a container to form a scintillator unit, setting the scintillator unit in a scintillation counter, and detecting radiation emitted from the radioactive substance in the scintillation counter.

Rather than using the liquid sample itself as an object to be detected, the radioactive substance contained in the liquid sample is extracted or condensed, and is used as the object to be detected, which can enhance the detection sensitivity. In addition, this method can facilitate use, as a measuring object, of the full amount of a large volume of a collected liquid sample. When the sample sheet is formed by sandwiching the carrier between the pair of films, handling of the radioactive substance can be facilitated. Further, in the above-described configuration, it becomes possible to reuse the radioactive substance and the scintillator members after measurement. Each of the above steps (other than the step of detecting radiation) may be manually performed, some or all of the steps may be automatically performed.

(2) Details of Embodiments

FIG. 1 shows an example configuration of a main part of a scintillation counter according to an embodiment. A scintillation counter 10 shown in FIG. 1 is a radiation measuring device configured to detect radiation emitted from a radioactive substance contained within a sample, and to compute, based on a resulting detection signal, a concentration, a radioactivity level, and other properties of the radioactive substance.

In the embodiment, an original sample prior to chemical treatment is a liquid sample, such as seawater, lake water, or river water. The radioactive substance being the measuring object is, for example, radioactive strontium $^{90}Sr$ contained within the sample. The half-life of the $^{90}Sr$ is 28.8 years, and the half-life of its daughter nuclide $^{90}Y$ is 64.1 hours. Separation of only the $^{90}Sr$ being a parent nuclide yields the daughter nuclide $^{90}Y$ immediately after the separation. A state of radiative equilibrium is reached in approximately two weeks from separation of the $^{90}Sr$. A radiation measurement may be conducted after reaching the state of radiative equilibrium (after an abundance ratio between the daughter nuclide and the parent nuclide reaches a constant state). However, when a below-described growth curve of the daughter nuclide $^{90}Y$ is used, it becomes possible to conduct the radiation measurement even before reaching the state of radiative equilibrium. In the radiation measurement, β rays emitted from the $^{90}Sr$ and β rays emitted from the $^{90}Y$ are measured. The measuring object may be other radioactive substances. In addition, other radioactive rays (such as, for example, γ rays) may be measured.

In FIG. 1, a rack 13 is conveyed on a stage 12 constituting a conveyer table. In the illustrated example, the rack 13 houses a plurality of scintillator units (such as scintillator bottles, scintillator assemblies). In FIG. 1, a specific scintillator unit 14 taken out from the rack 13 is transferred into a measurement chamber 16. In FIG. 1, a scintillator unit 14A which has not yet been taken out is indicated with chain double-dashed lines. After completion of the radiation measurement, the scintillator unit 14 is returned to the rack 13.

Then, the rack 13 is conveyed by one step (see reference symbol 13A) along a conveyance direction 38, and in this state, the next scintillator unit is introduced into the measurement chamber 16. The above process steps are repeated.

The measurement chamber 16 is surrounded by a radiation shielding member formed of lead or other materials. The radiation shielding member prevents external radiation, such as cosmic rays, from entering the inside of the measurement chamber 16, or greatly reduces entry of the external radiation into the measurement chamber 16. A publicly known guard detector may be installed in order to exclude from a target object to be counted pulses associated with the external radiation.

An elevator mechanism 18 is configured to transfer the scintillator unit 14 between the rack 13 and the measurement chamber 16. While FIG. 1 shows the measurement chamber 16 arranged below the stage 12, this arrangement is merely depicted by way of illustration. The measurement chamber 16 may be arranged above the stage 12. In this case, the scintillator unit 14 is transferred upward by the elevator mechanism 18. It should be noted that, in FIG. 1, an up and down direction (vertical direction) is a z direction, a first horizontal direction is an x direction, and a second horizontal direction is a y direction.

A plurality of light receiving surfaces 34a, 36a of a plurality of optical detectors 34, 36 are placed inside the measurement chamber 16. The plurality of light receiving surfaces 34a, 36a are opposed to a side surface of the scintillator unit 14 which is in the shape of a cylindrical surface. The plurality of optical detectors 34, 36 may be entirely located within the measurement chamber 16. The plurality of optical detectors 34, 36 may be composed of, for example, two photo multiplier tubes which are arranged at an angular interval of 180 degrees as viewed from above, or three photo multiplier tubes which are arranged at an angular interval of 120 degrees as viewed from above. Alternatively, the plurality of optical detectors 34, 36 may be arranged in other ways. Two detection signals output from the two photo multiplier tubes or three detection signals output from the three photo multiplier tubes are processed through coincidence counting. Count values are computed based on signals obtained through the coincidence counting. Based on the computed count values, a concentration, a radioactivity level, and other features are computed for the $^{90}Sr$ which is a target nuclide. This will be described in detail further below.

The scintillator unit 14 includes a bottle 20 having a cylindrical shape, and a laminate 22 housed within the bottle 20 and formed in a columnar shape. The bottle 20 has a columnar internal space. The laminate 22 having the vertically laminated structure is housed and positioned within the internal space. The bottle 20 is an example of the retainer. The bottle 20 includes a main body 24 and a cap 40 for closing an upper opening of the main body 24. The bottle 20 is formed of an optically transparent material. Placing prime importance on optical transmittance, the bottle 20 may be formed of a highly transparent material. Alternatively, placing prime importance on scattering of light, the bottle 20 may be formed of a material having a light scattering property (such as, for example, a milky-white material having a certain level of transparency). The bottle 20 may be equipped, as needed, with a reflector configured to direct light onto each of the light receiving surfaces 34a, 36a.

The laminate 22 includes, as described below, an intermediate layer composed of a sample sheet, an upper scintillator layer (upper member) constituting an upper layer of the laminate, and a lower scintillator layer (lower member)

constituting a lower layer of the laminate. When the β rays from the radioactive substance (of $^{90}$Sr and $^{90}$Y in the embodiment) within the sample sheet enter either one of the scintillator layers, scintillation occurs therein; i.e., light is emitted. The emitted light is detected by the plurality of optical detectors 34, 36.

A middle level of the plurality of optical detectors 34, 36 in the z direction (a center level of the light receiving surface) is indicated by reference sign z1. The height of the laminate 22 is set in such a manner that in a state where the scintillator unit 14 is positioned within the measurement chamber 16, a middle level of the laminate 22 (a sample sheet level) matches the middle level z1. For this height setting, a below-described spacer is used. Such height adjustment can lead to enhanced detection efficiency.

It should be noted that while a certain amount of clearance is present between the plurality of light receiving surfaces 34a, 36a and the scintillator unit 14 in FIG. 1, the plurality of light receiving surfaces 34a, 36a are, in an actual arrangement, disposed close to the scintillator unit 14 in a non-contacting manner in order to enhance a light detection efficiency. The measurement chamber 16 is configured to be a darkroom during the radiation measurement. To this end, a shutter mechanism is provided, which is not illustrated.

Figure 2:
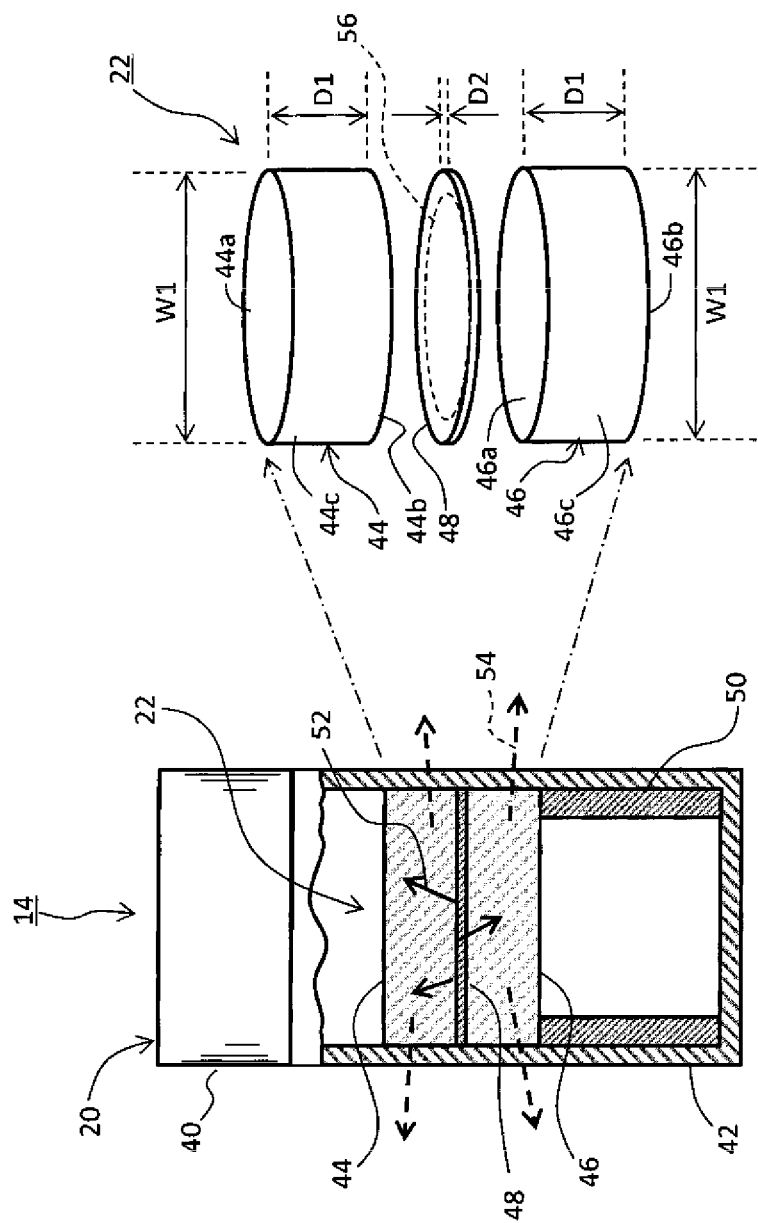
FIG. 2 is a diagram showing a first example configuration of a scintillator unit.

FIG. 2 shows, on the left side, the scintillator unit 14. On the right side in FIG. 2, the laminate 22 within the scintillator unit 14 is shown.

With reference to the left side in FIG. 2, the scintillator unit 14 is a scintillator bottle. Specifically, the scintillator unit 14 includes the bottle 20 formed as a hollow container, the laminate 22 placed within the bottle 20, and a spacer 50 configured to support the laminate 22 within the bottle 20. The bottle 20 has a hollow main body 42 having a cylindrical shape, and a cap 40 for closing an upper opening of the main body 42. A screw-type joint structure, which is configured to be partially present on both the cap 40 and the main body 42, is not illustrated in the diagram. One of screw structures is defined on an outer circumferential surface in an upper region of the main body 42, and the other of the screw structures is defined on an inner circumferential surface of the cap 40. When the cap 40 is rotated relative to the main body 42 in one direction, engagement between the two screw structures is established. Rotation in the other direction releases the engagement.

The cap 40 may be attached to the main body 42 in other manners. For example, a projection and depression structure may be formed so as to be partially present on both the main body 42 and the cap 40. Then, connection between the main body 42 and the cap 40 may be established by the projection and depression structure. Alternatively, it is also conceivable to use the bottle 20 which does not need any cap.

As described below, a radioactive substance is trapped within a sample sheet. Taking this as a precondition, the primary function of the bottle 20 is to retain the laminate 22. Therefore, any retainer other than the container may be utilized as long as the retainer is able to appropriately retain and carry the laminate 22. For example, the laminate 22 may be retained by means of a frame body, a stand, or the like. In this case, a retainer including an optical guide may be used.

However, when the bottle 20 is used, it becomes possible that when a leak of the radioactive substance occurs, the leaked radioactive substance can be contained within the bottle 20. Further, when the bottle 20 is used, the laminate 22 can be easily installed and placed in position, and also easily removed from the bottle 20. As long as the cap 40 is mounted on the main body 42, the bottle 20 can provide an advantageous effect that the laminate 22 is prevented from accidentally falling out of the bottle 20 when the bottle 20 is toppled over.

The laminate 22 includes a sample layer 48 composed of the sample sheet, an upper scintillator layer (upper member) 44 disposed on an upper side of the sample layer 48, and a lower scintillator layer (lower member) 46 disposed on a lower side of the sample layer 48. In the embodiment, the laminate 22 has a form in the shape of a circular column or in the shape of a disc which has a certain degree of thickness, and an outer diameter of the laminate 22 substantially corresponds with an inner diameter of the bottle 20. There is a clearance between an inner circumferential surface of the bottle 20 and an outer circumferential surface of the laminate 22, but the clearance is very small. With this structure, the laminate 22 can be easily placed in position with respect to a horizontal direction. In other words, correct positioning of the laminate 22 can be achieved just as a result of correct positioning of the bottle 20.

The sample layer 48 has a form in a circular shape or a disc shape. A planarly spreading radioactive substance is trapped inside the sample layer 48. The upper scintillator layer 44 and the lower scintillator layer 46 are composed of a solid scintillator material capable of detecting β rays; specifically, a plastic scintillator material. Other scintillator materials may be used. Scintillator materials which detect other types of radiation, such as, for example, γ rays, may be used. The upper scintillator layer 44 and the lower scintillator layer 46 have the same form, and specifically the form in the shape of a column or a disc being thick to a certain extent. It is also conceivable that each form of the upper scintillator layer 44 and the lower scintillator layer 46 is in a polygonal shape as viewed from above. The polygonal shape may include a square, a hexagon, an octagon, etc. In view of minimizing directional dependency, it is desirable that a circular shape or a polygonal shape close to a circle be employed as the form of the scintillator layers 44 and 46. Further, in terms of manufacturing, it is desirable that the circular shape be employed as the form.

In the illustrated configuration example, the spacer 50 has a form in the shape of a cylinder. The form is merely presented by way of illustration. A columnar spacer, a base seat with support posts, and other components may be utilized. A feature, such as a ring-shaped projection functioning as a spacer, may be formed on the inner circumferential surface of the main body 42. However, independent formation of the main body 42 and the spacer as separate components allows selection of spacers depending on the thickness of the laminate 22. In the diagram shown on the left side of FIG. 2, a ring-shaped lower surface of the spacer 50 is in physical contact with an inner bottom surface of the main body 42. A ring-shaped upper surface of the spacer 50 is brought into contact with a lower surface of the laminate 22. The spacer 50 is composed of an optically transparent material. The spacer 50 having a light reflecting effect or a light diffusing effect may be used. The spacer 50 supports the laminate 22 in such a manner that the laminate 22 is placed in its correct position; i.e., the center line of the laminate 22 extends vertically.

In the scintillator unit 14, when β rays 52 emitted from the sample layer 48 enter the upper scintillator layer 44 or the lower scintillator layer 46, light is emitted inside the upper scintillator layer 44 or the lower scintillator layer 46, and the emitted light propagates through the bottle 20 to the outside. In the outside of the bottle 20, the light is detected by a plurality of optical detectors.

On the right side in FIG. 2, the laminate 22 includes, as has been described above, the upper scintillator layer (upper member) 44, the scintillator layer (sample sheet) 48, and the lower scintillator layer (lower member) 46 which are arranged on top of one another. The upper scintillator layer 44 includes a top surface 44a, a bottom surface 44b, and a circumferential side surface 44c, some or all of which may be treated with roughening and coarsening. Alternatively, some or all of the surfaces 44a, 44b, and 44c may be treated with mirror finishing. The upper scintillator layer 44 has a diameter of W1 and a thickness of D1.

The lower scintillator layer 46 includes a top surface 46a, a bottom surface 46b, and a circumferential side surface 46c. Similarly to the above, some or all of the surfaces 46a, 46b, and 46c may be treated with roughening and coarsening, or alternatively treated with mirror finishing. The lower scintillator layer 46 has a diameter of W1 and a thickness of D1. The upper scintillator layer 44 and the lower scintillator layer 46 may have nonidentical forms, while they may have the same form, which is desirable in light of the detection efficiency or detection accuracy. Employing the same form of the upper and lower scintillator layers 44 and 46 has advantageous effects that manufacturing costs can be reduced, and that assembling process can be facilitated.

Further alternatively, the bottom surface 44b and the top surface 46a which are brought into contact with the sample layer 48 may be treated with mirror finishing, while the remaining surfaces of the top surface 44a, the circumferential side surface 44c, the bottom surface 46b, and the circumferential side surface 46c may be treated with roughening and coarsening. The above-described W1 is, for example, 30 mm or 50 mm. The above-described D1 is, for example, in a range of 10 to 20 mm. However, the numerical values are presented by way of illustration, and may be changed depending on a type and energy of the radiation to be detected. For example, the bottle 20 has a height of 80 mm and an outer diameter of 30.5 mm or 50.5 mm. The inner diameter of the bottle 20 may be 30 mm or 50 mm. The height of the sample layer 48 is at a distance of 43 mm from a bottom surface level of the bottle 20. The above numerical values are presented also by way of illustration.

In the illustrated example, the sample layer 48 is composed of the sample sheet. The illustrated sample sheet is wrapped around a filter paper sheet 56 functioning as a filter. The radioactive substance is adhered onto the filter paper sheet 56. For example, the planarly spreading radioactive substance is adhered to one of surfaces of the filter paper sheet 56. The filter paper sheet 56 may be entirely wetted with the radioactive substance. Packaging of the radioactive substance together with the filter paper sheet 56 leads to good operability. The good operability obtained by the packaging is also maintained in a case of reusing the radioactive substance. However, in a case where attenuation of the radiation due to filtering paper cannot be ignored, it is desirable that the radioactive substance is solely packaged. Some configuration examples of the sample layer 48 will be described with reference to FIGS. 3 to 6 below.

The sample layer 48 has a diameter of W1 and a thickness of D2. The diameter of the sample layer 48 is defined to be equal to or smaller than the diameter of the upper scintillator layer 44 and the lower scintillator layer 46. The thickness D2 is, for example, defined in a range of 0.2 mm to 6 mm. In detection of low-energy radiation, it is desirable in terms of reduction in, so-called self absorption, that the sample layer 48 (in particular, a pair of films, which will be described in detail below) have a small thickness. A diameter of the filter paper sheet 56 is smaller than the diameter W1 of the sample layer 48. A circumferential edge portion corresponding to a region created by a difference in diameter of the sample layer 48 and the filter paper sheet 56 functions as a joint region of the two films.

Figure 3:
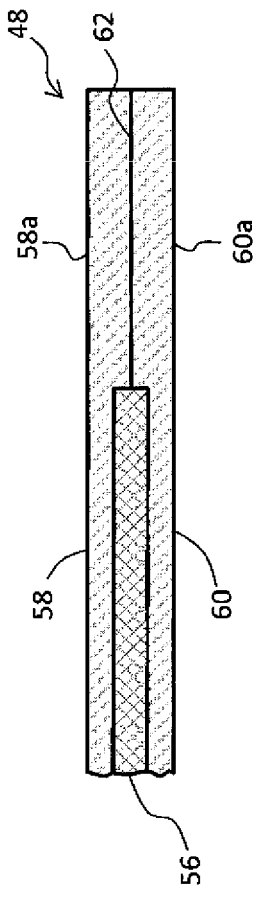
FIG. 3 is a diagram showing a first example of a sample layer.

FIG. 3 shows a cross section view of the sample layer 48 illustrated in FIG. 2. The sample layer 48 is configured as a sample sheet which is composed of the filter paper sheet 56 having the radioactive substance adhered thereto, and a pair of films 58 and 60 which are configured to wrap the filter paper sheet 56. The pair of films 58 and 60 are subjected to a laminating process. Specifically, circumferential edge portions 58a and 60a of the films 58 and 60 are joined to each other through thermal processing; i.e., being in a thermally welded state (see reference numeral 62). The laminating process is performed through a heating and pressing method while preventing entrainment of an undesired air layer between the pair of films 58 and 60.

According to the laminating process, handling and positioning of the radioactive substance can be easily performed. In particular, the laminating process has an advantageous effect that it becomes unnecessary to perform a process of extracting the radioactive substance from the filter paper sheet. In addition, when the sample sheet formed as described above is sandwiched between the upper member and the lower member, the upper member and the lower member can be prevented from getting contaminated and can be fit for reuse. Reuse of the radioactive substance (for example, remeasurement of the radioactive substance in another device) can be facilitated. It is desirable that each film be composed of a material which does not noticeably cause attenuation of the radiation, and that a thickness of each film be suppressed to an extent to which the radiation is not noticeably attenuated. Each film may be formed of a very thin polyethylene film.

Figure 4:
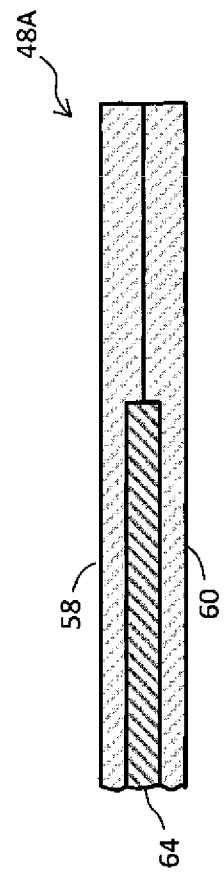
FIG. 4 is a diagram showing a second example of the sample layer.

FIG. 4 shows a second example of the sample layer. A sample layer 48A is composed of a thin resin sheet 64 to which the radioactive substance is adhered, and the pair of films 58 and 60 used for the laminating process. The resin sheet 64 is composed, for example, of polytetrafluoroethylene. As such, the laminating process may be performed on a component other than the filter paper sheet.

Figure 5:
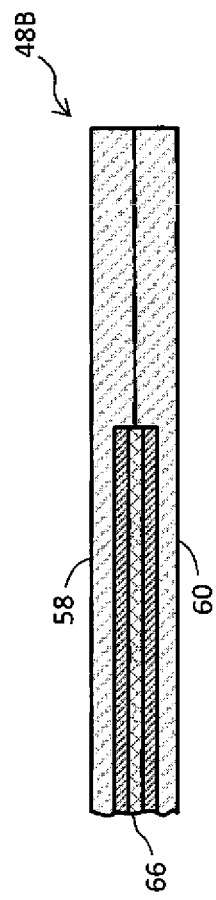
FIG. 5 is a diagram showing a third example of the sample layer.

FIG. 5 shows a third example of the sample layer. A sample layer 48B is composed of a selective disc 66 and the pair of films 58 and 60 used for the laminating process. The selective disc is a component configured to selectively extract and capture only a specific radioactive substance, and has a layered structure in the illustrated example. For example, a selective disc configured to selectively extract the $^{90}$Sr which is a target nuclide to be measured is used. A selective disc composed of a single solid layer may be used.

Figure 6:
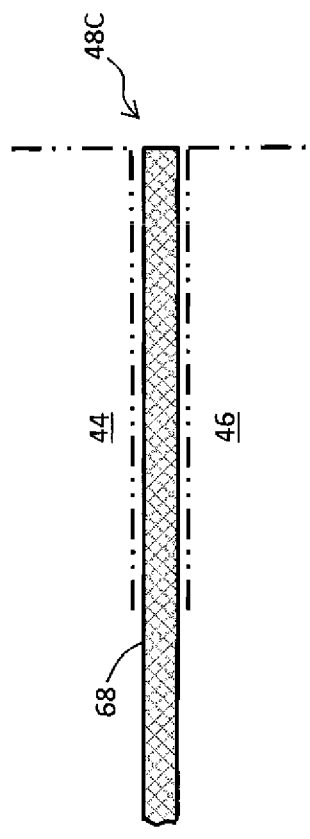
FIG. 6 is a diagram showing a fourth example of the sample layer.

FIG. 6 shows a fourth example of the sample layer. A sample layer 48C is composed of a filter 68 formed of a filter paper sheet or the like. The radioactive substance is adhered to the filter 68. The laminating process is not applied to the filter 68. The upper scintillator layer 44 is brought into direct contact with a top surface of the filter 68, and the lower scintillator layer 46 is brought into direct contact with a bottom surface of the filter 68. In a case of indirectly contacting manners shown in FIGS. 3 to 5, attenuation of the radiation through the pair of films will be problematic when energy of the radiation is low, while in a case of the directly contacting manner shown in FIG. 6, because the pair of films are not provided, there is no attenuation of the radiation. However, in the fourth example shown in FIG. 6, the radioactive substance is directly adhered to the upper member 44 and the lower member 46. To avoid this, it is desirable that the manner shown in FIGS. 3 to 5 be employed.

Figure 7:
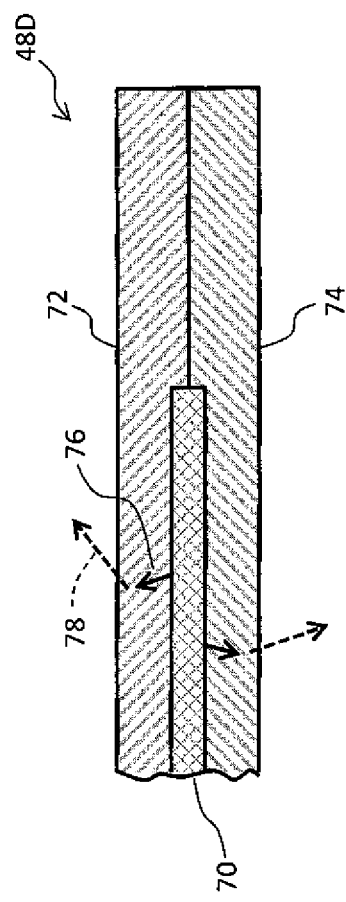
FIG. 7 is a diagram showing a modification example of a laminate.

FIG. 7 shows a modification example of the laminate. A laminate 48D is composed of a filter 70 having the radioactive substance adhered thereto, and a pair of circular scintillator sheets 72 and 74 configured to sandwich the filter 70. The scintillator sheets 72 and 74 function as the above-described upper and lower members, respectively, and are formed of plastic scintillators, for example. The laminating process may be performed on the pair of scintillator sheets 72 and 74, or may not be performed thereon. When employing this configuration, it is desirable to increase a thickness of each of the scintillator sheets 72 and 74 to a certain extent. Radiation 76 emitted from the radioactive substance within the filter 70 and entering the scintillator sheets 72 and 74 causes scintillation therein, and light 78 resulting from the scintillation is released into an external environment. The light emitted into the external environment is directed to the plurality of light receiving surfaces by means of roughening and coarsening, a light reflective material, or the like.

Figure 8:
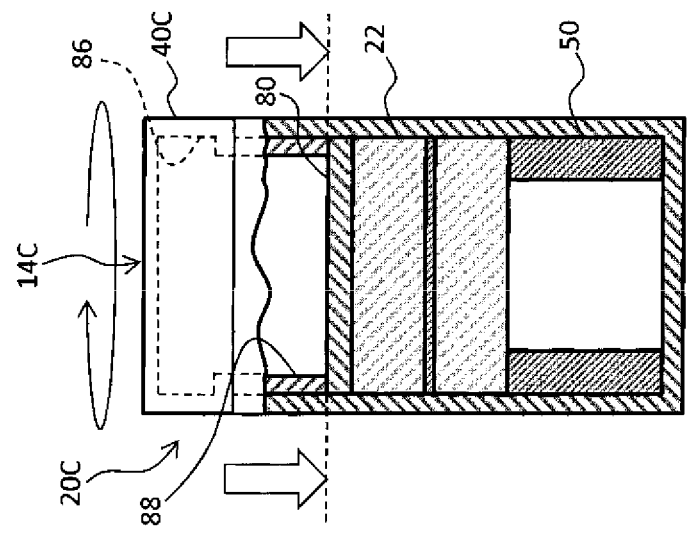
FIG. 8 is a diagram showing a second example configuration of the scintillator unit.

FIG. 8 shows a second configuration example of the scintillator unit. A scintillator unit 14B is composed of a bottle 20B and the laminate 22. The bottle 20B includes the main body 42 and a cap 40B. The laminate 22 is supported by the spacer 50. A pusher plate 80 is disposed above the laminate 22. The pusher plate 80 is formed of a transparent material. A spring 82 functioning as a pushing means is placed between a top surface of the pusher plate 80 and a ceiling surface 81 of the cap 40B. When the cap 40B is rotated in one direction relative to the main body 42, the main body 42 and the cap 40B are moved in a direction that they approach to each other by action of a screw-type joint structure arranged on both the main body 42 and the cap 40B. This causes the spring 82 to be in a compressed state or in a further compressed state, to thereby apply a vertical pushing force (compression force) onto the laminate 22 through the pusher plate 80. Due to the pushing force, the upper layer and the lower layer are brought into intimate contact with the sample layer which is the intermediate layer within the laminate 22. This allows the upper layer and the lower layer to approach the sample layer, which can in turn enhance the detection efficiency. The spring 82 may be removed, while the pusher plate 80 may be configured to function as a weight.

Figure 9:
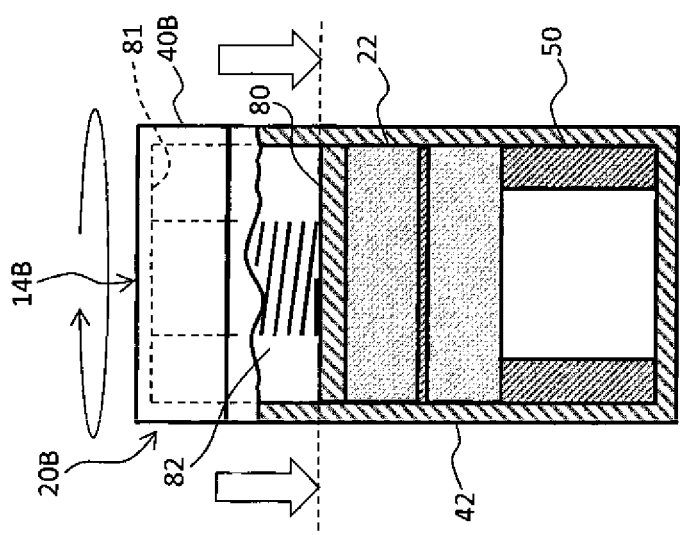
FIG. 9 is a diagram showing a third example configuration of the scintillator unit.

FIG. 9 shows a third configuration example of the scintillator unit. A scintillator unit 14C is composed of a bottle 20C and the laminate 22. A cap 40C for the bottle 20C has a leg portion 88 in the shape of a cylinder. Specifically, the leg portion 88 extends downward from an inner circumferential surface 86 of the cap 40C, and a lower end of the leg portion 88 enters the inside of the main body through the upper opening of the main body. Rotation of the cap 40C relative to the main body causes a height of the lower end of the leg portion 88 to be gradually lowered, which produces a pushing force in the pusher plate 80. In this way, similarly to the second configuration example shown in FIG. 8, the compression force is applied to the laminate 22. The spacer 50 may be formed of an elastic deformable material.

FIG. 10 shows a modification example of the scintillator unit. A scintillator unit 14D is composed of a bottle 92 and the laminate 22. The bottle 92 is divided into two parts in the vertical direction, and is specifically composed of an upper part 94A and a lower part 94B. Atop region of the upper part 94A constitutes a neck portion having a small diameter, and the neck portion has an opening. The opening is covered by a cap 96. Inside the lower part 94B, the spacer 50 is inserted and the laminate 22 is arranged on the spacer 50.

Then, the upper part 94A is joined to the lower part 94B. For example, two edge regions 98a and 98b may be joined to each other using an adhesive or other means.

The above-described modification example may be employed when it is desired that the laminate 22 be placed within the bottle 92 which is commercially available. In the modification example, reuse of the bottle 92 is difficult while a cumbersome task, such as dividing work, is required. In this respect, the bottle shown in FIG. 2 and other diagrams may be preferably employed; the bottle into which the laminate having the outer diameter almost equal to the inner diameter of the bottle can be droppingly inserted from the upper opening, and the bottle which can be processed in the scintillation counter.

Figure 13:
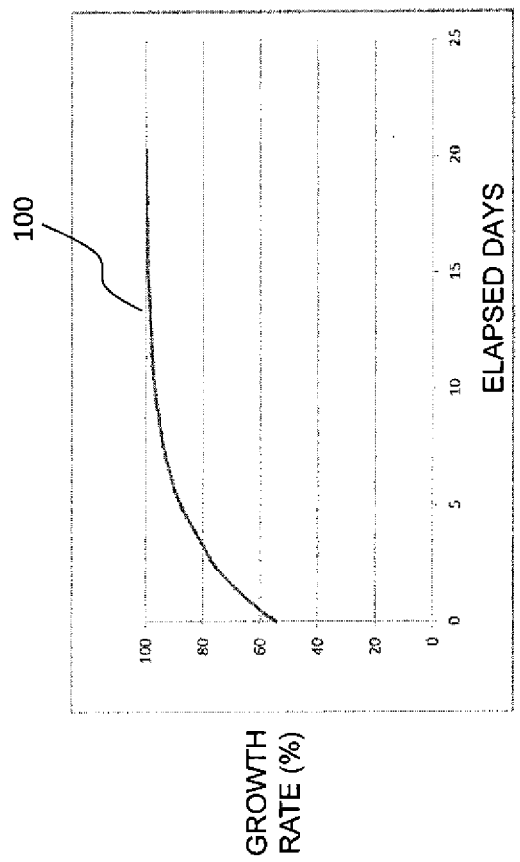
FIG. 13 is a diagram representing a growth curve of a daughter nuclide $^{90}Y$ in a case where $^{90}Sr$ is a measuring object.

Next, a radiation measuring method using the above-described scintillator unit will be described with reference to FIGS. 11 to 13. The radiation measuring method according to an embodiment includes steps which are broadly categorized into a pretreatment process and a measurement process. The pretreatment process is illustrated in FIG. 11, and the measurement process is illustrated in FIG. 12.

In the pretreatment process shown in FIG. 11, an original sample (which may be of a large quantity) is chemically treated in step S10, to generate a sample including the $^{90}Sr$ as a target nuclide. For example, an eluted solution containing the $^{90}Sr$ is extracted using an ion exchange column. Then, a predetermine chemical treatment is applied to the eluted solution, to thereby generate a precipitate containing the $^{90}Sr$. A time when the $^{90}Sr$ is separated is taken as a start time of a growth curve of yttrium. Immediately after separation of the $^{90}Sr$, its daughter nuclide $^{90}Y$ is produced. In step S12, the precipitate is collected on a filter paper sheet. Then, passing through a drying process, the filter paper sheet containing the $^{90}Sr$ is, in step S14, subjected to the laminating process in which the sample sheet is produced. In step S16, the laminate including the sample sheet is formed and placed within the bottle, to constitute the scintillator unit.

In the measurement process illustrated in FIG. 12, the scintillator unit is set in the scintillation counter in step S20. In step S22, the scintillator unit is conveyed into the measurement chamber in the scintillation counter. Then, scintillation is detected. In this way, measurement values are obtained as counted values or the like. In step S24, based on the measurement values, an elapsed time, and the growth curve, a concentration, a radioactivity level, and other properties of the parent nuclide 90Sr are computed after removing the counted value of the daughter nuclide $^{90}Y$. The elapsed time is a length of time that has elapsed from the above-described start time until a time of radiation measurement. An example of the growth curve is shown in FIG. 13. The horizontal axis represents elapsed days (length of time), and the vertical axis represents a growth rate. The growth rate is a ratio which is determined taking the state of radiative equilibrium as 100%. The abundance ratio between the parent nuclide, $^{90}Sr$ and its daughter nuclide, $^{90}Y$ is determined from the growth curve. That is, determination of the abundance ratio corresponding to the elapsed time can allow computation of the concentration, radioactivity level, and other properties of the parent nuclide, $^{90}Sr$, from the measurement values.

According the above-described radiation measuring method, it becomes possible to measure, as a measuring object, a large quantity of a specific nuclide contained in a high volume of sample water, which can help enhance the measurement sensitivity. Further, the concentration and other properties of the nuclide being the measuring object can be computed at an early stage prior to reaching the state of radiative equilibrium. Still further, the filter paper sheet used as the carrier is only subjected to the laminating process without applying any other treatments, which can lead to good workability. There is very little possibility that contamination occurs on the scintillation counter.

The invention claimed is:

1. A scintillator unit comprising:
an upper member composed of a solid scintillator member which is disposed on an upper side of a radioactive sample;
a lower member composed of a solid scintillator member which is disposed on a lower side of the radioactive sample, the lower member cooperating with the upper member to directly or indirectly sandwich the radioactive sample; and
a retainer configured to retain a laminate which comprises the upper member, the radioactive sample, and the lower member, wherein the laminate has a form of a columnar shape.

2. The scintillator unit according to claim 1, wherein the retainer is a container configured to house the laminate.

3. The scintillator unit according to claim 2, further comprising:
a support member configured to support the laminate in a state where a middle level of the laminate matches a reference level within the container.

4. The scintillator unit according to claim 2, wherein the container comprises a structure configured to apply a pushing force along a vertical direction to the laminate in a state where the laminate is housed in the container.

5. The scintillator unit according to claim 1, further comprising:
a sample sheet containing the radioactive sample, the sample sheet being disposed between the upper member and the lower member, wherein
the sample sheet comprises;
an upper film disposed on the upper side of the radioactive sample; and
a lower film disposed on the lower side of the radioactive sample.

6. The scintillator unit according to claim 5, wherein the upper film and the lower film are joined to each other in circumferential edge regions thereof.

7. The scintillator unit according to claim 5, wherein:
the radioactive sample is adhered to a carrier; and
the carrier including the radioactive sample adhered thereto is sandwiched between the upper film and the lower film.

8. A radiation measuring device, comprising:
a rack configured to hold a scintillator unit;
a measurement chamber into which the scintillator unit taken off from the rack is introduced; and
a plurality of optical detectors having a plurality of light receiving surfaces which are opposed to the scintillator unit disposed within the measurement chamber, wherein the scintillator unit comprises;
an upper member composed of a solid scintillator member which is disposed on an upper side of a radioactive sample;
a lower member composed of a solid scintillator member which is disposed on a lower side of the radioactive sample, the lower member cooperating with the upper member to directly or indirectly sandwich the radioactive sample; and
a retainer configured to retain a laminate which comprises the upper member, the radioactive sample, and the lower member, wherein the laminate has a form of a columnar shape.

9. A radiation measuring method comprising:
adhering a radioactive substance contained within a liquid sample to a carrier;
sandwiching the carrier having the radioactive substance adhered thereto between a pair of films to produce a sample sheet;
sandwiching the sample sheet between an upper scintillator member and a lower scintillator member to form a laminate;
placing the laminate within a container to form a scintillator unit;
setting the scintillator unit in a scintillation counter; and
detecting a radiation emitted from the radioactive substance in the scintillation counter.

* * * * *